Figure 1:
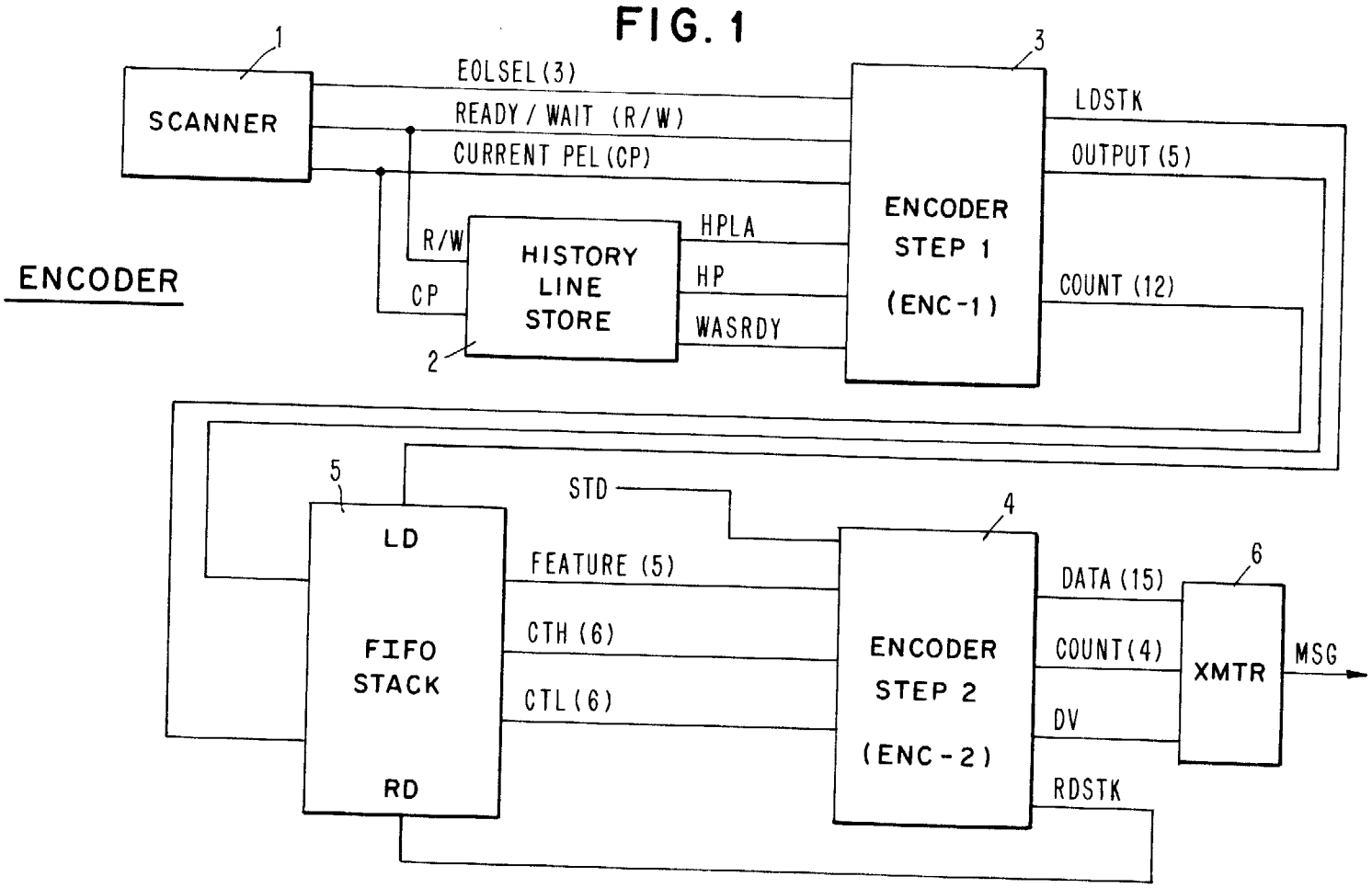
Figure 2:
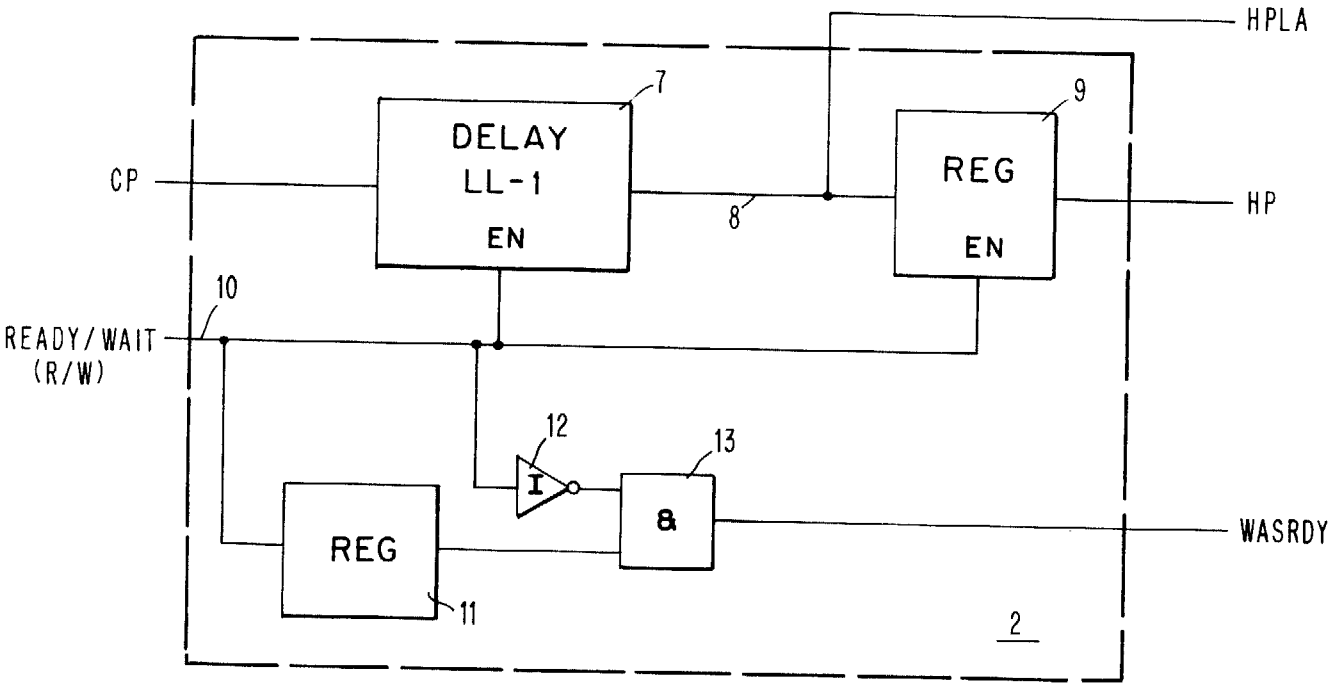
Figure 3:
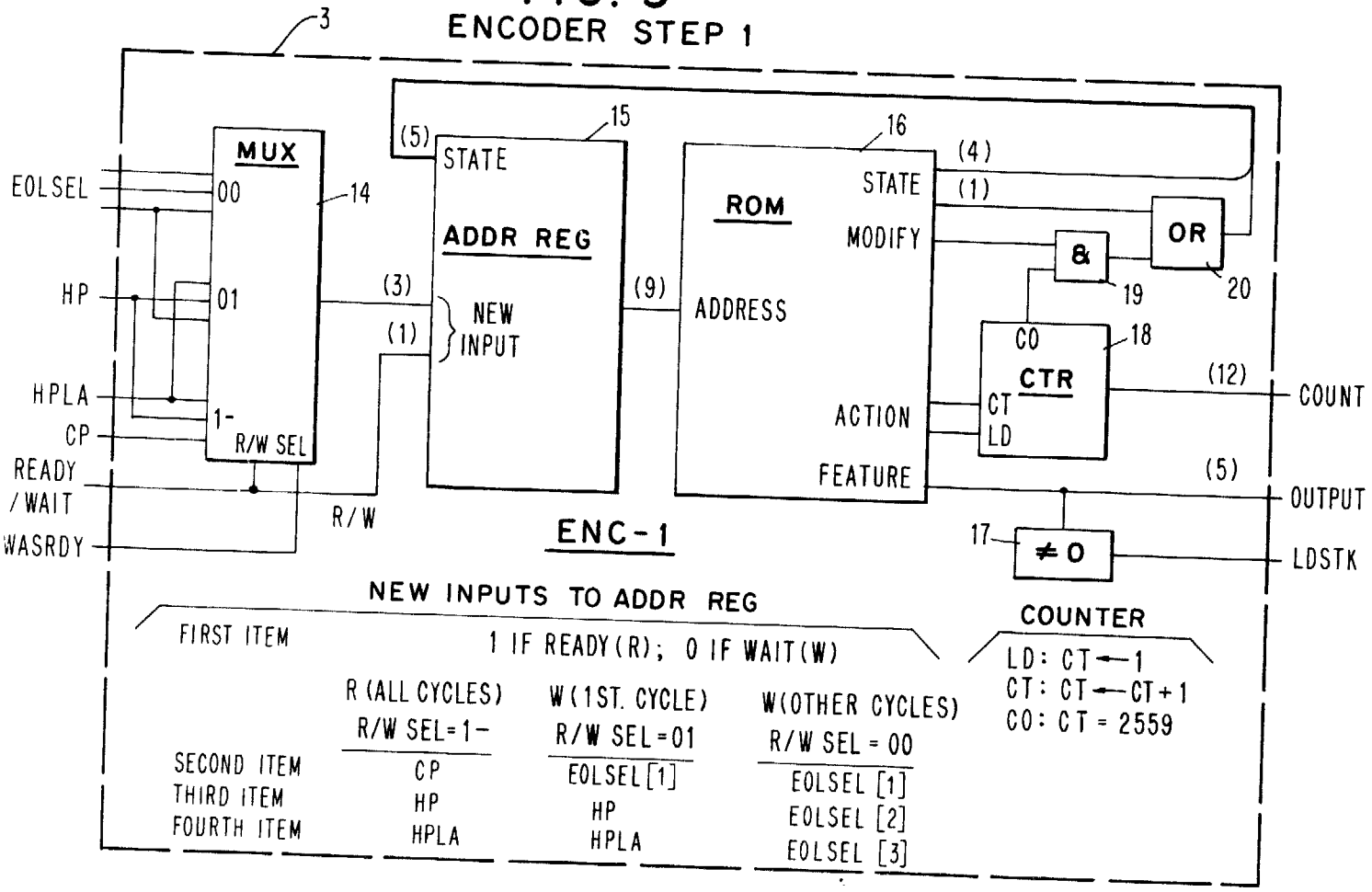
Figure 5A:
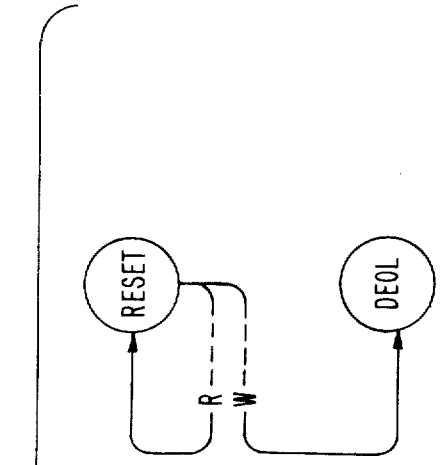
Figure 5B:
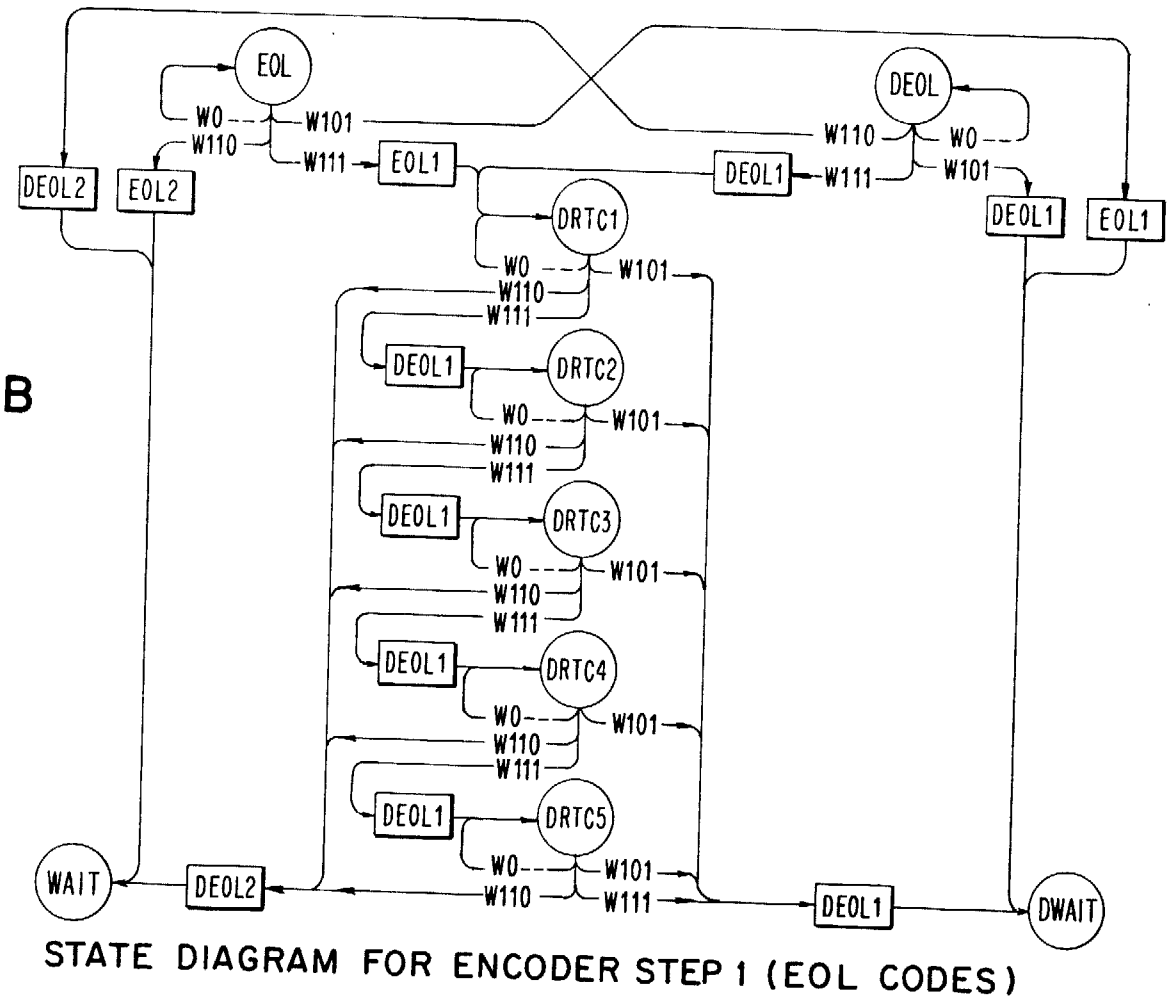
Figure 5C:
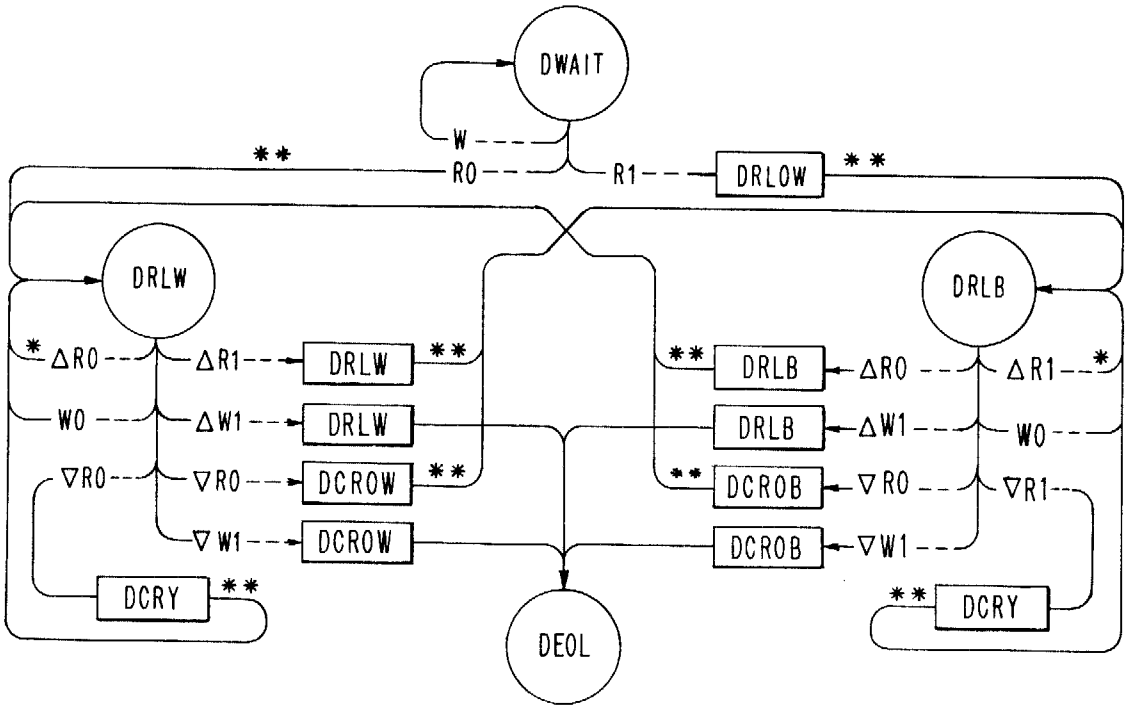
Figure 5D:
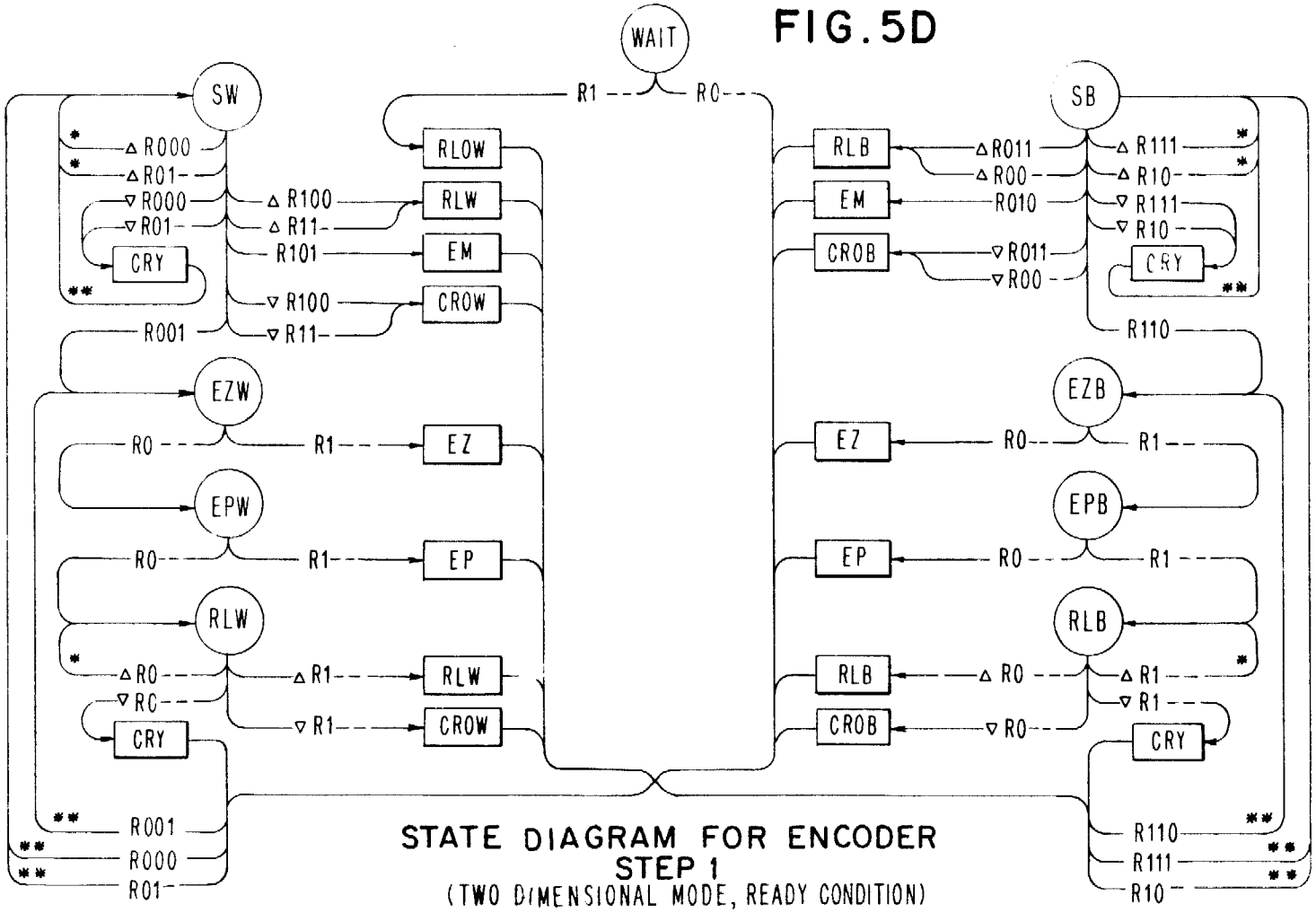
Figure 5E:
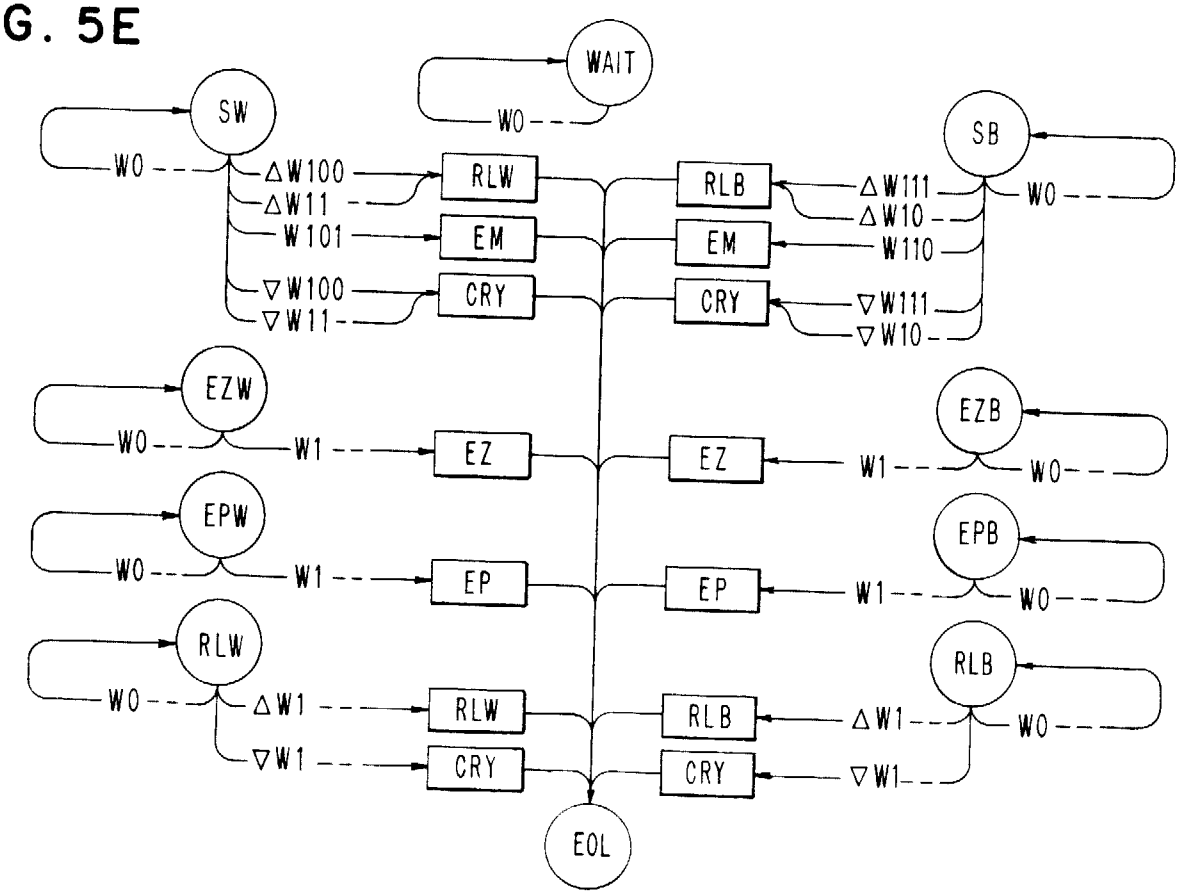
Figure 6:
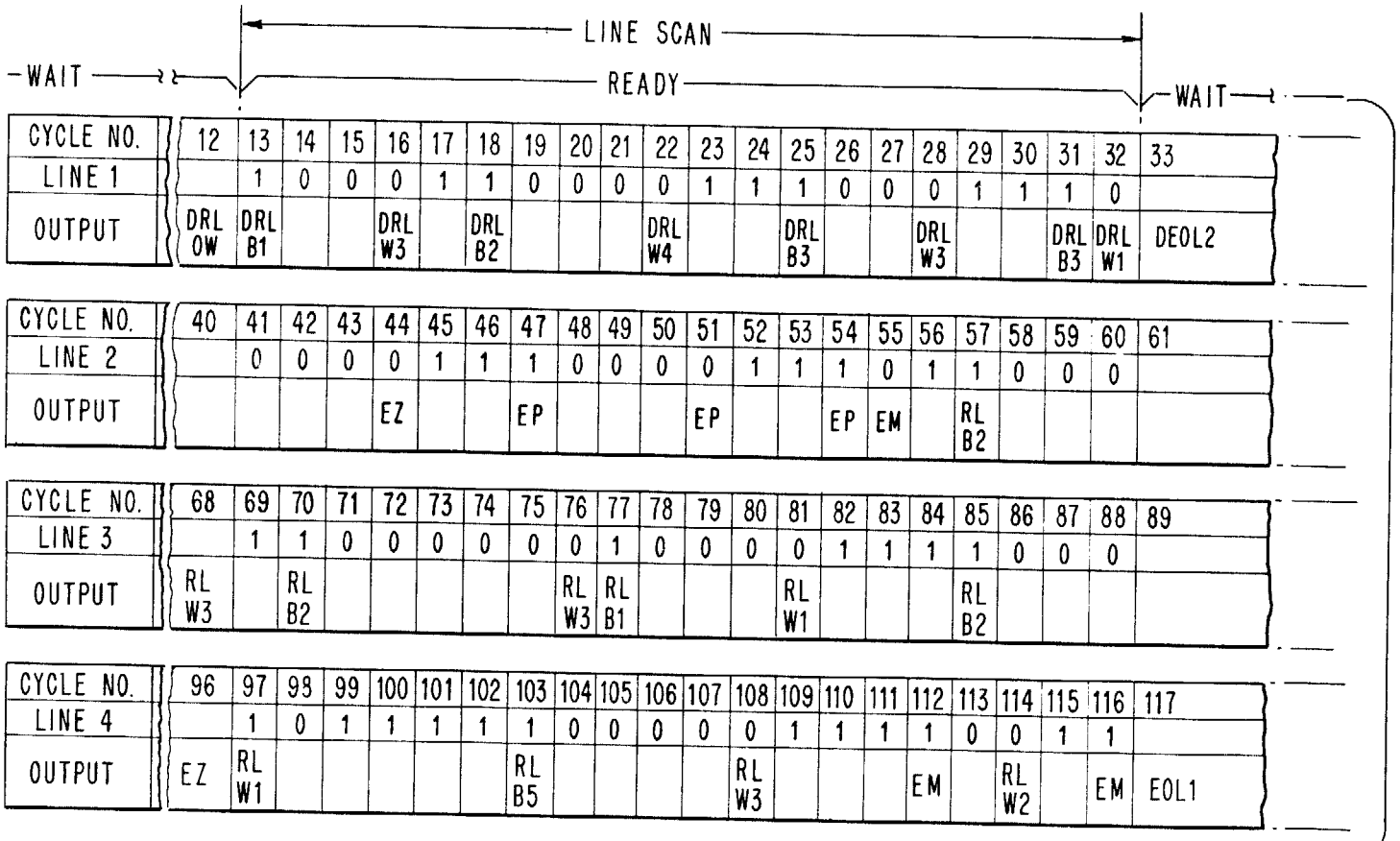
Figure 7:
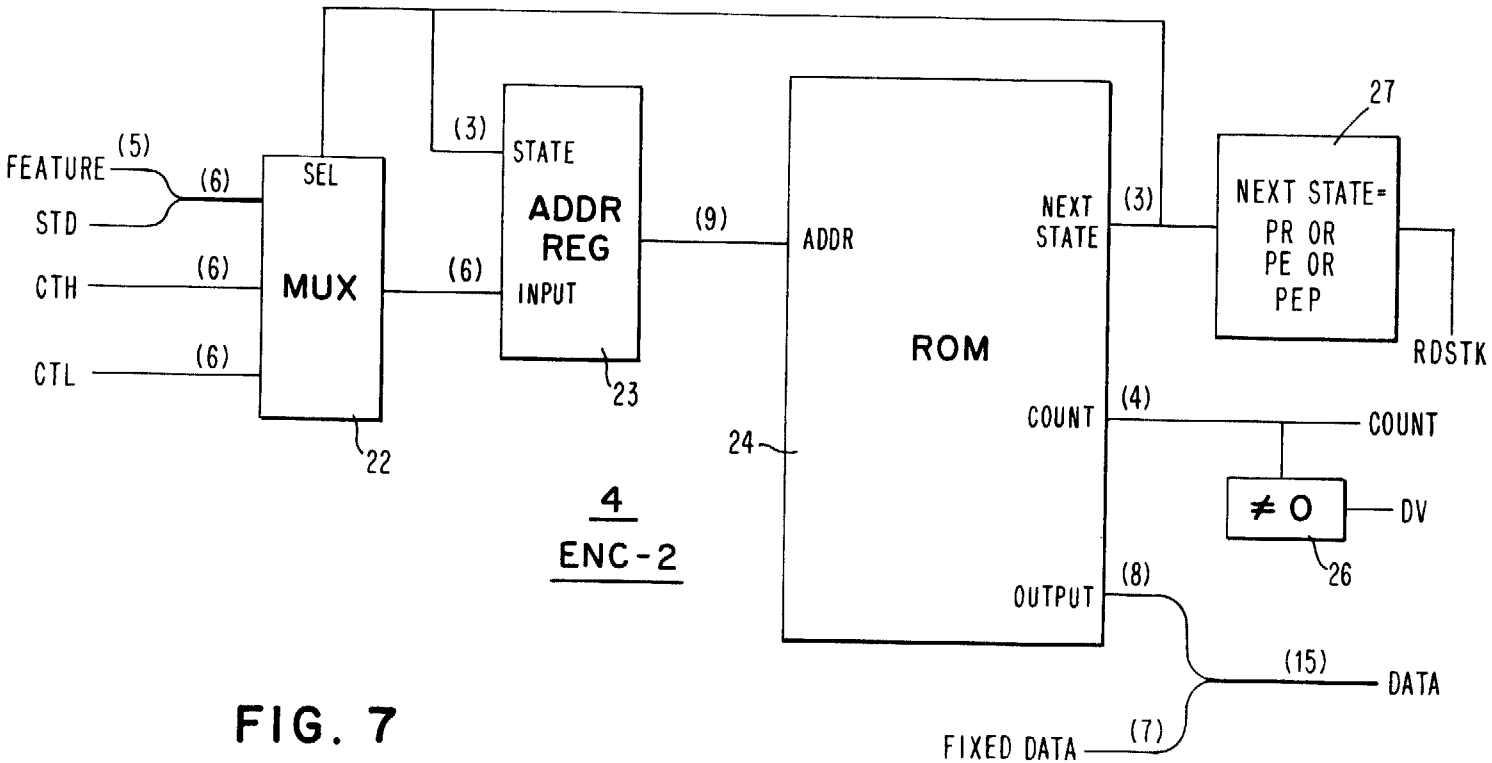
Figure 8A:
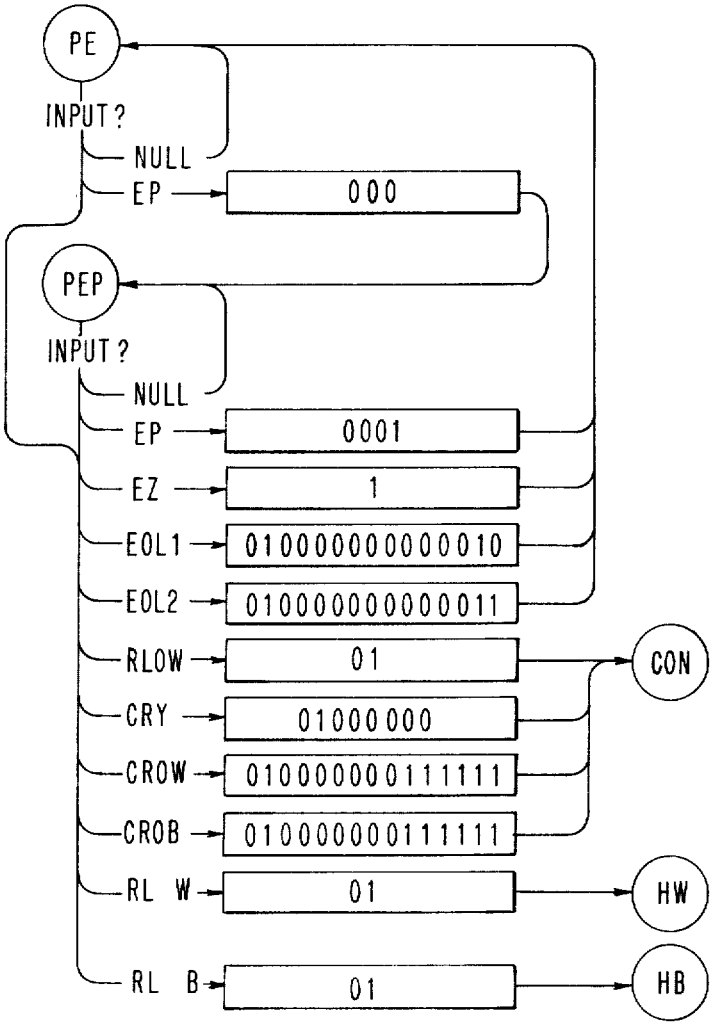
Figure 8B:
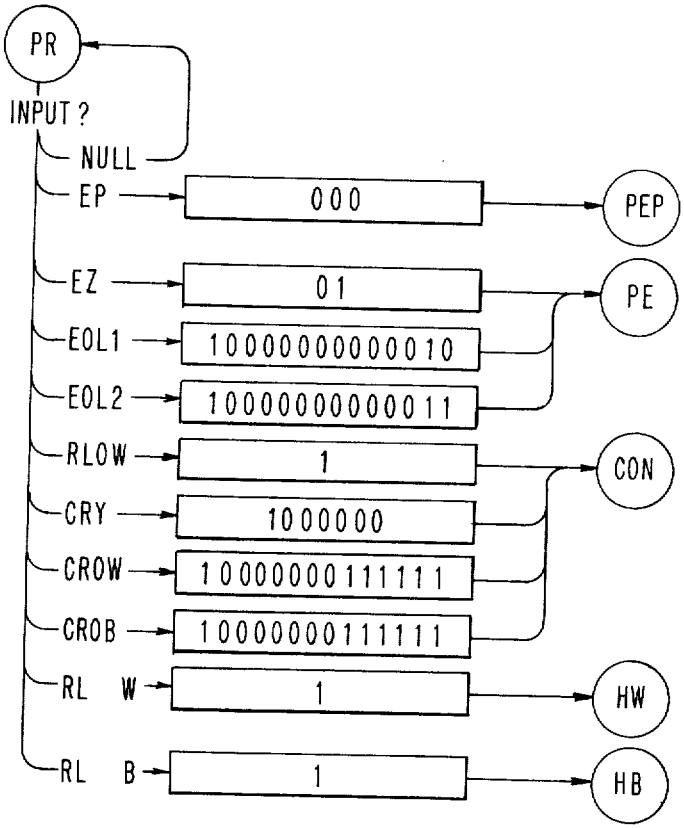
Figure 8C:
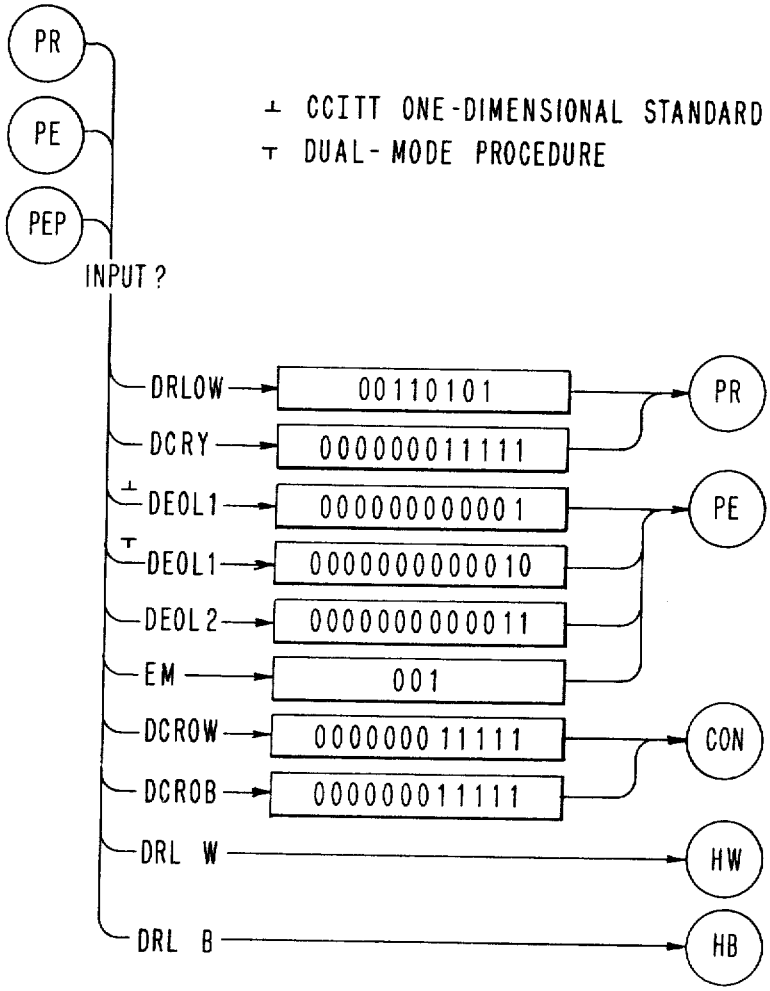
Figure 8D:
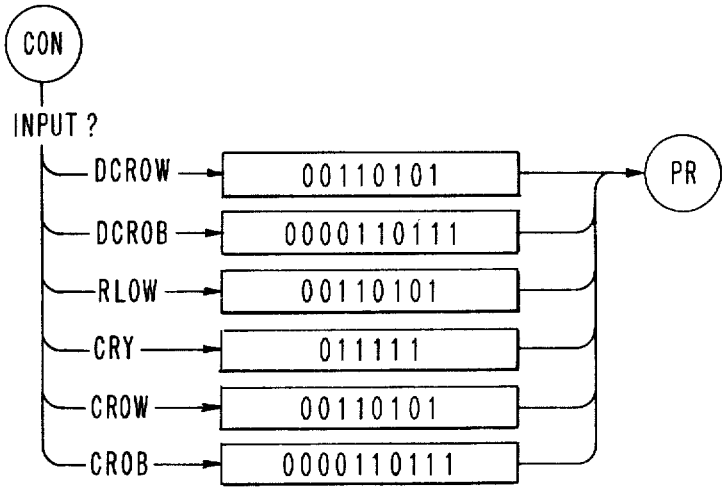
Figure 8E:
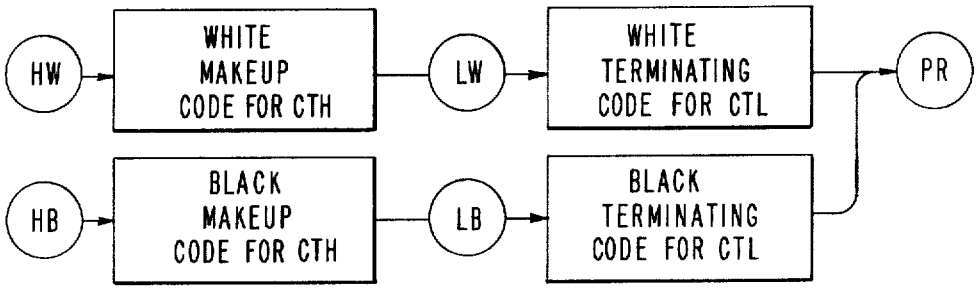
Figure 9:
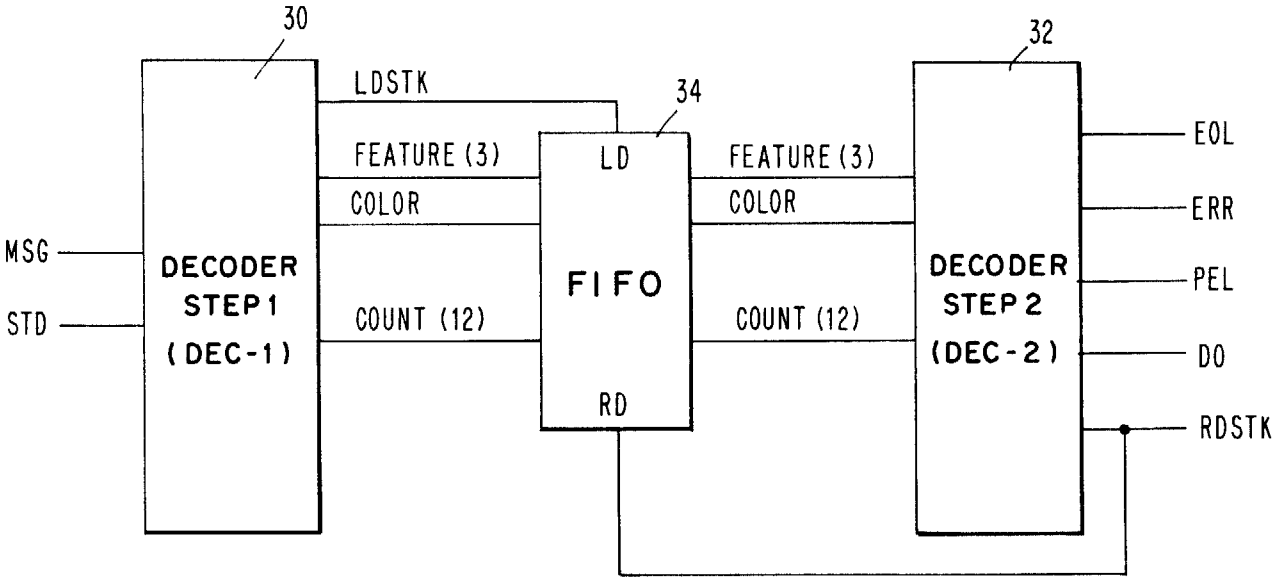
Figure 10:
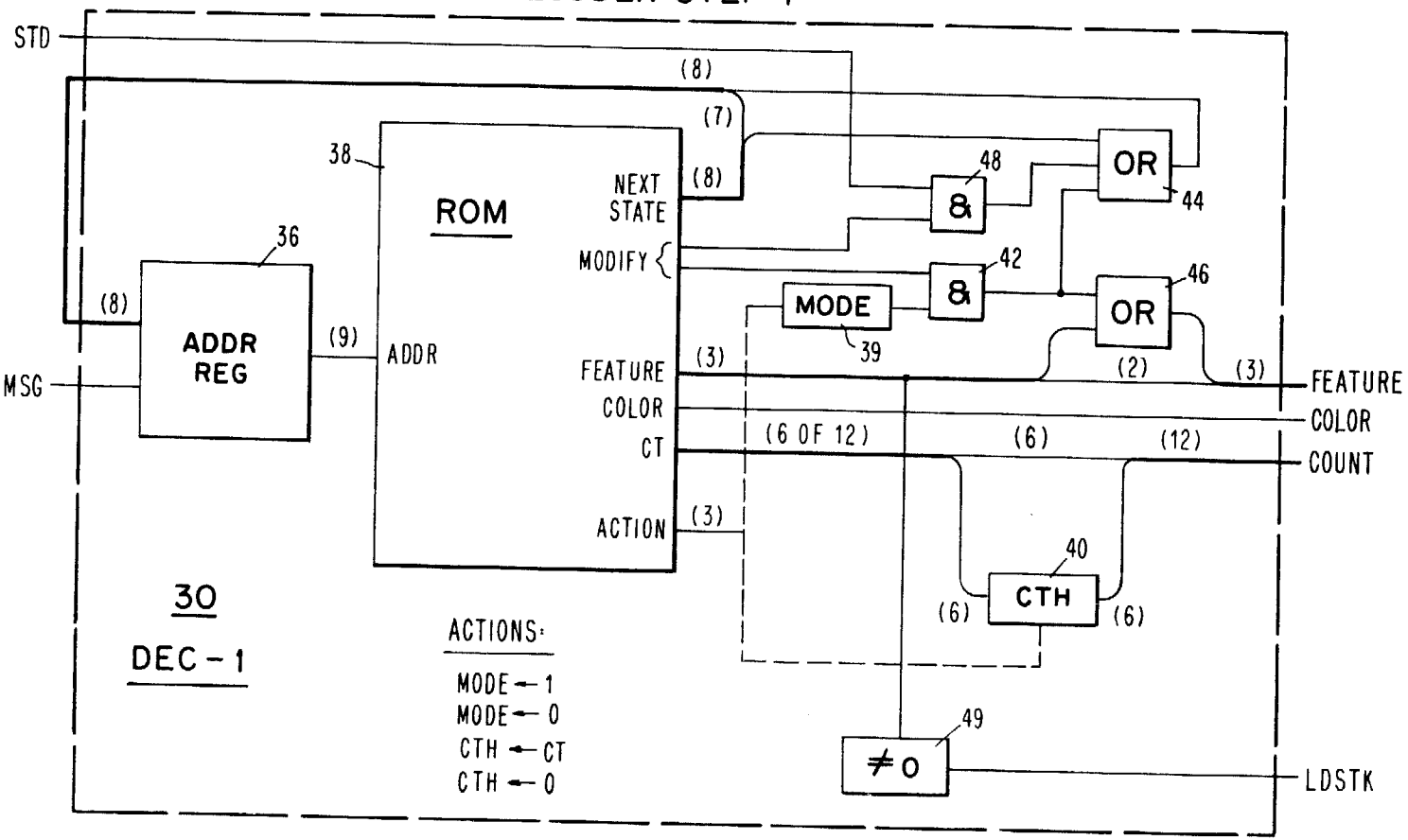
Figure 11A:
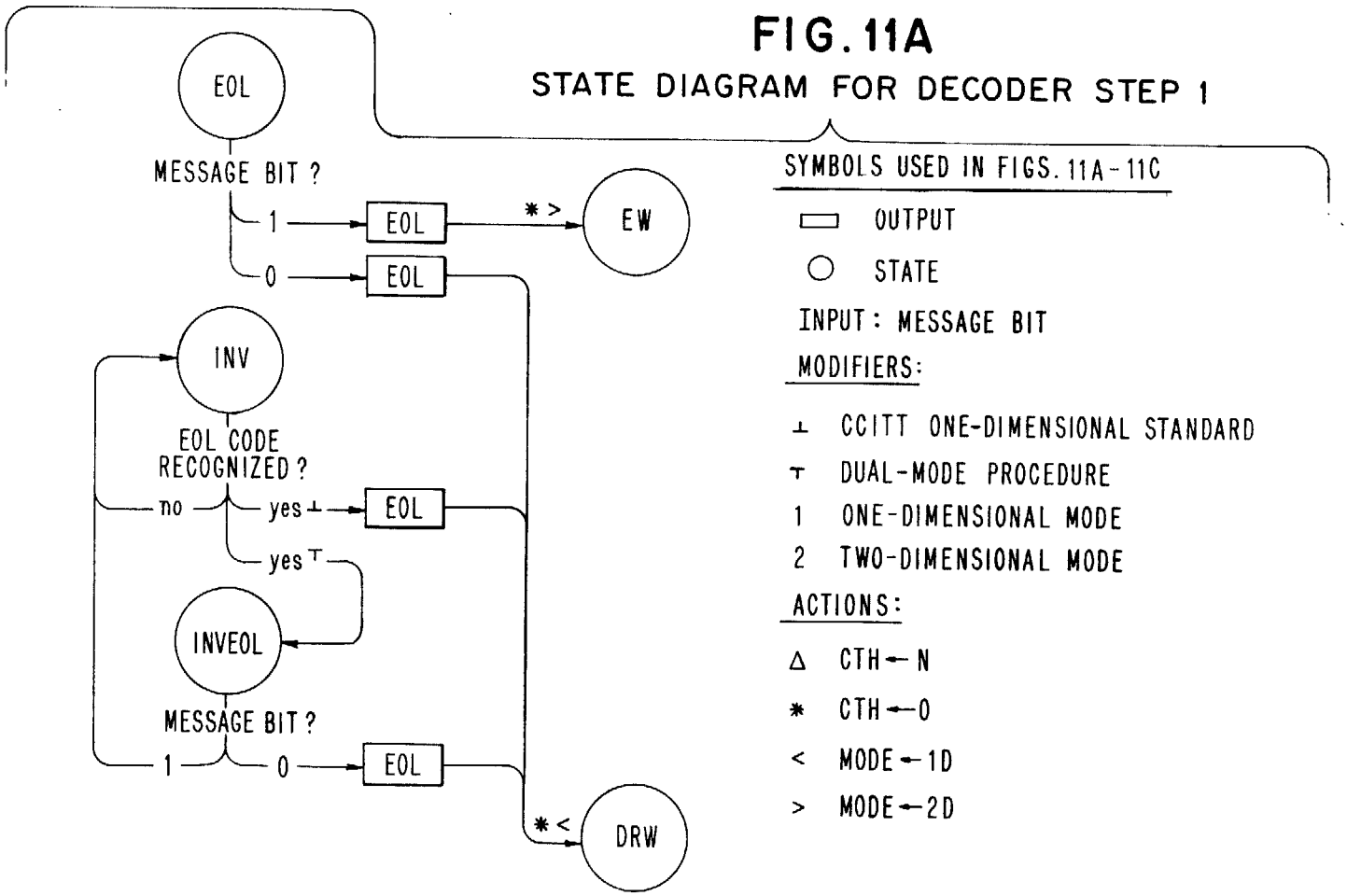
Figure 11B:
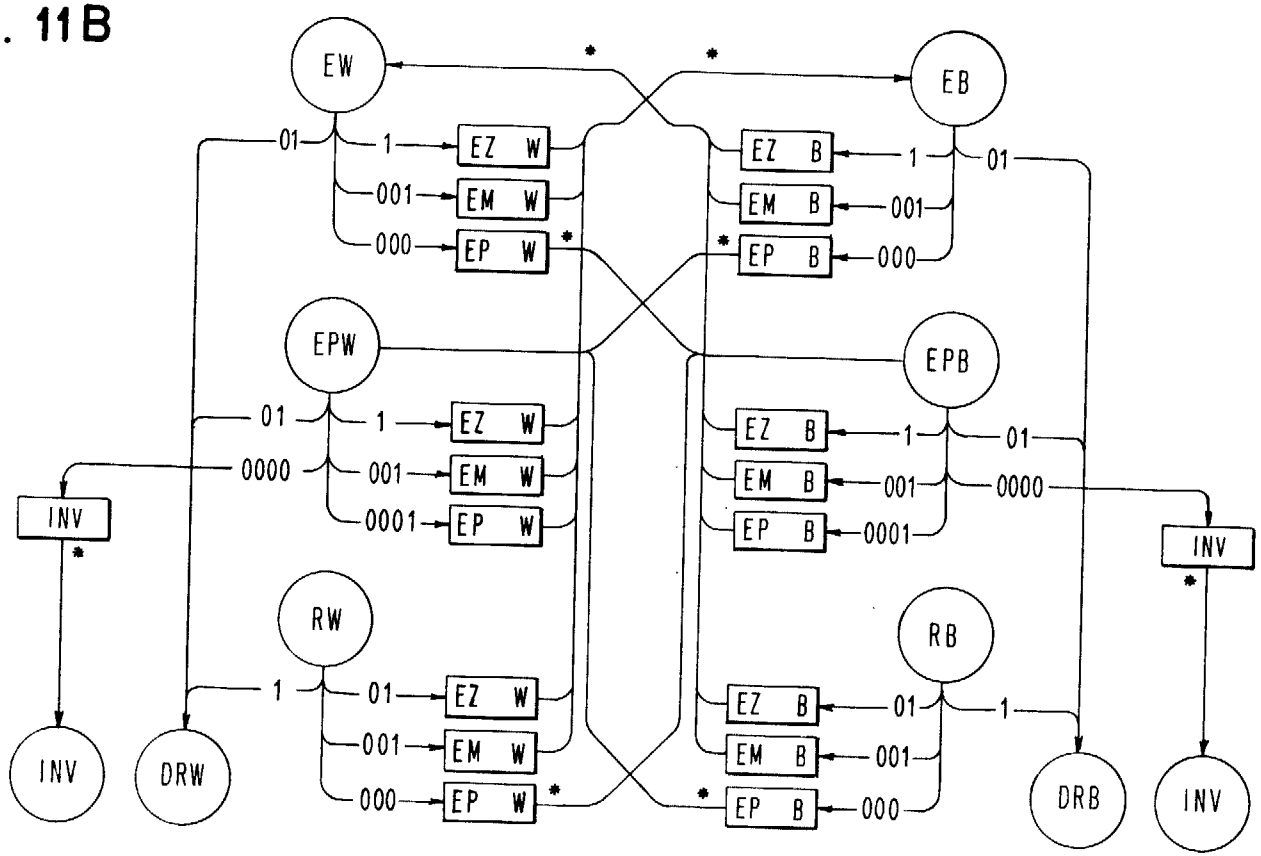
Figure 11C:
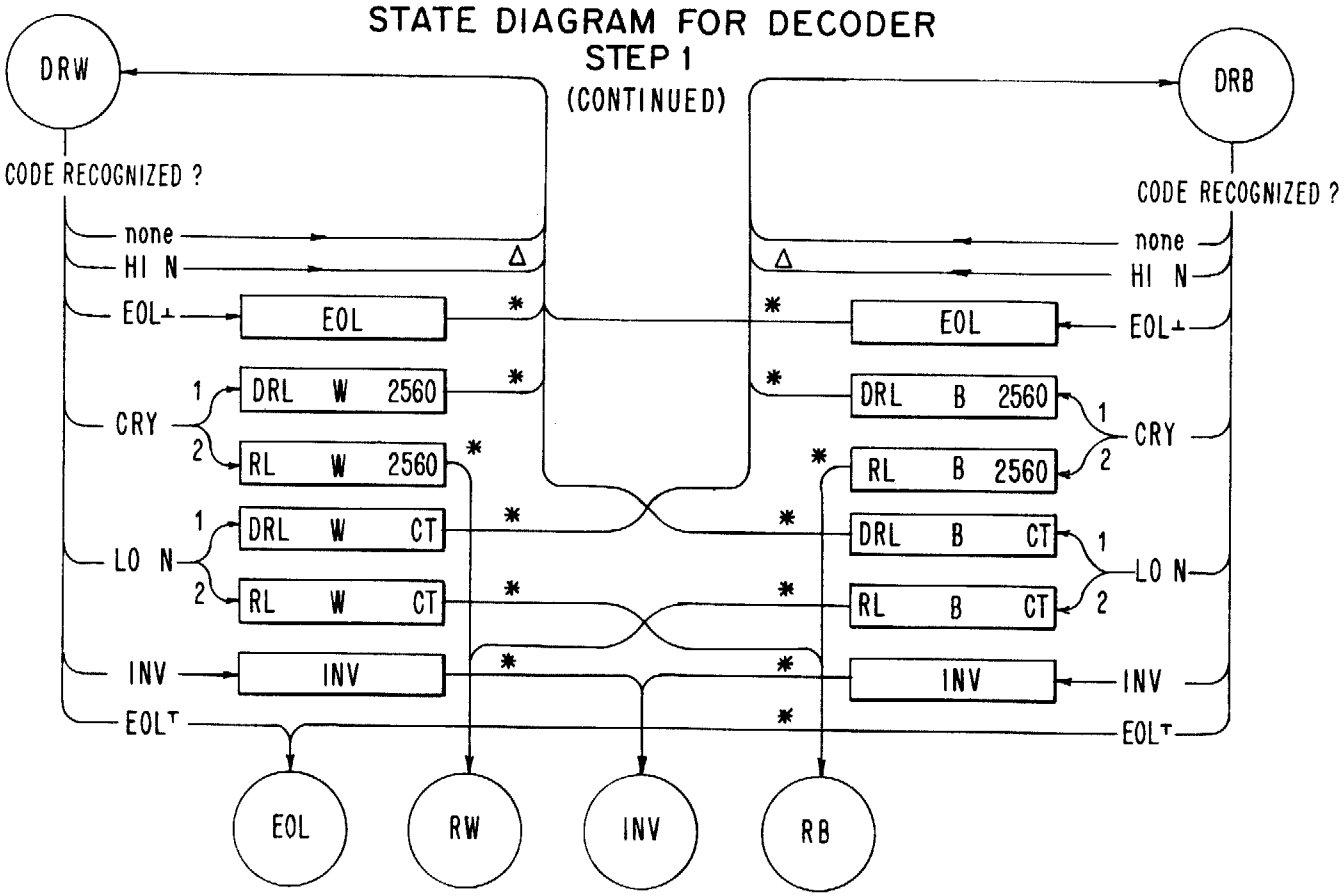
Figure 12:
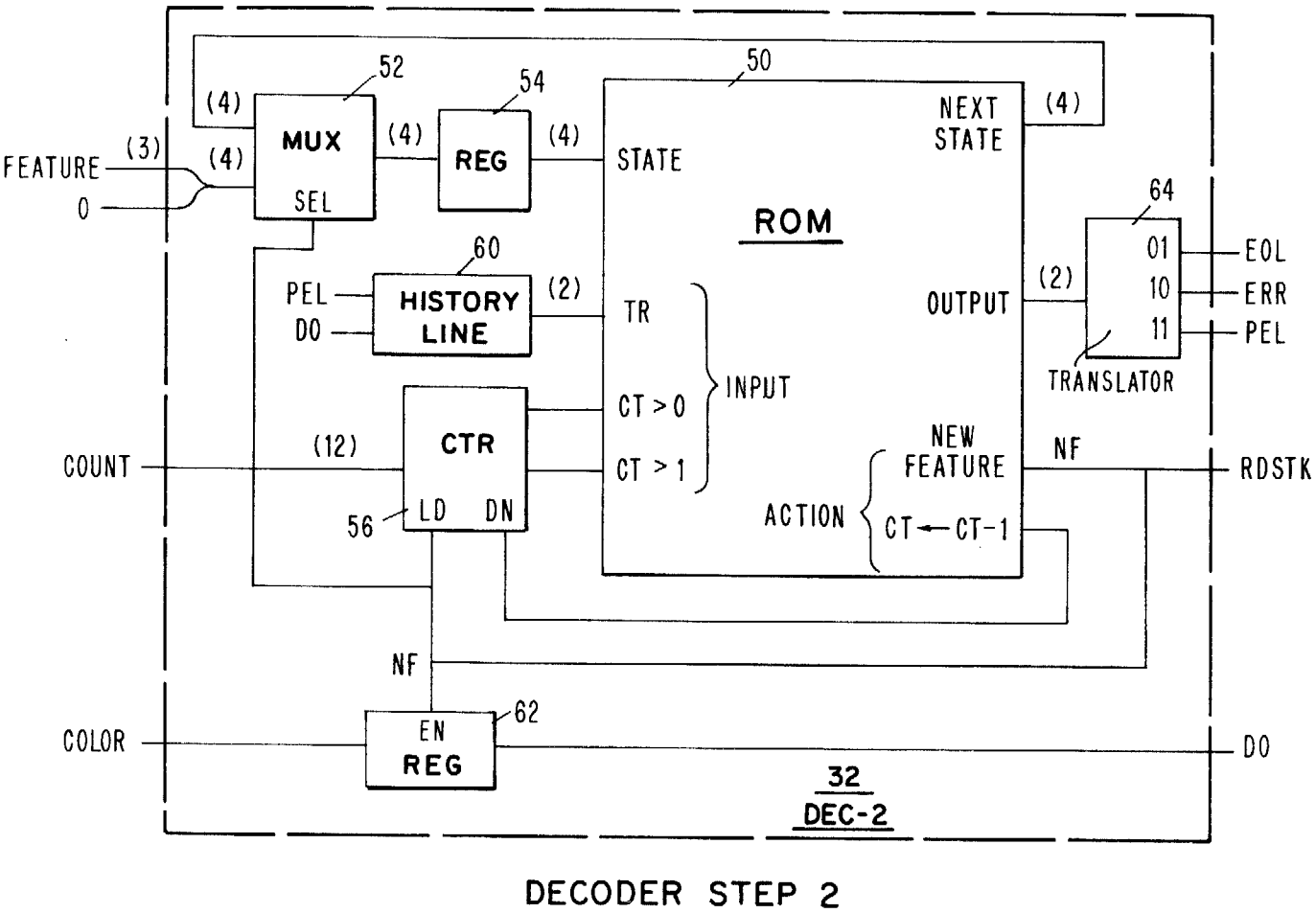
Figure 13:
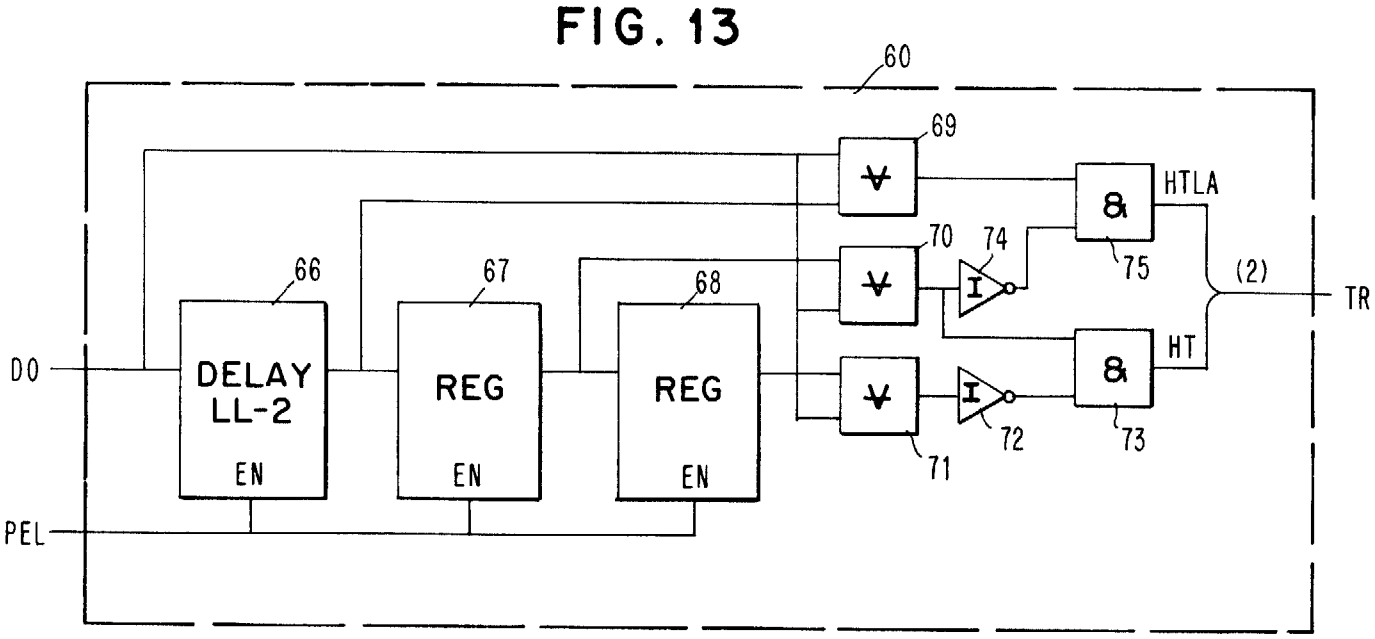
Figure 14:
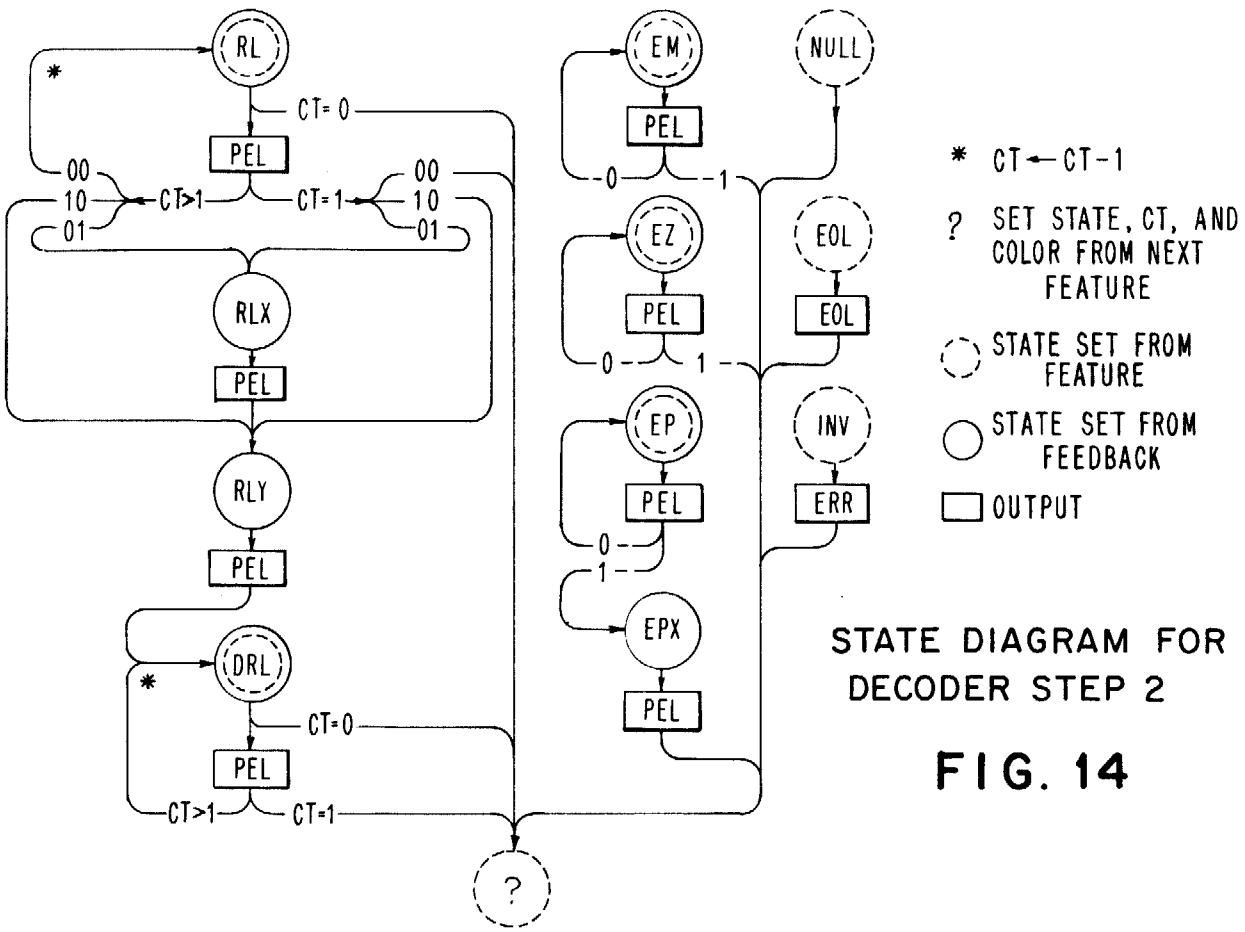

United States Defensive Publication [19] (H) [11] T985,005

Goertzel et al. [43] Aug. 7, 1979

[54] TWO-DIMENSIONAL IMAGE DATA COMPRESSION AND DECOMPRESSION SYSTEM

[76] Inventors: Gerald Goertzel, 7 Sparrow Cir., White Plains, N.Y. 10605; Joan L. Mitchell, 1206 Main St., Peekskill, N.Y. 10566

[21] Appl. No.: 951,532

[22] Filed: Oct. 16, 1978

[51] Int. Cl.[2] ..... G06F 15/20

[52] U.S. Cl. ..... 364/515; 358/260; 358/261; 364/200

[57] ABSTRACT

A dual-mode encoding and decoding procedure enables image data to be compressed optionally in one-dimensional (1D) mode or two-dimensional (2D) mode. In 1D mode, color transitions in the image are encoded as run length features only. In 2D mode, the transitions are encoded as vertical correlation features wherever possible, and where this is not possible, the transitions are encoded as run length features. The compression achieved by run length encoding in 2D mode may be enhanced in those instances where the "history line" which precedes the current scan line contains a transition located between points that are vertically aligned with the beginning and end points of the run currently being encoded. Run length counting is suspended for those pels in the current run that could have been referenced to the history transition if the run had ended with any of these pels, thereby enabling the run to be encoded as though it contained fewer pels than its actual length. Compression may be enhanced still further by dynamically interchanging the variable-length bit patterns respectively representing certain vertical correlation and run length prefix codes depending upon whether the preceding transition was encoded as a vertical correlation feature or a run length feature.

20 Claims, 23 Sheets Drawing,

166 Pages Specification

The file of this unexamined application may be inspected and copies thereof may be purchased (849 O.G. 1221, Apr. 9, 1968).

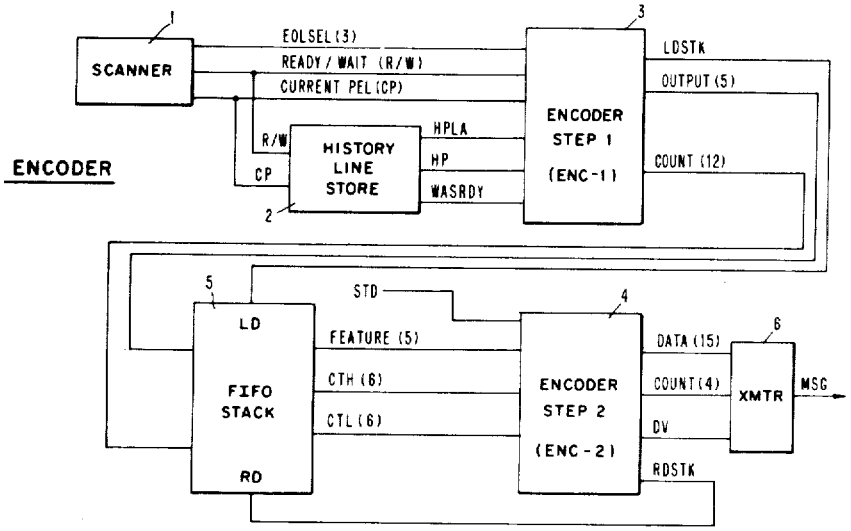

ENCODER

ENCODER
HISTORY LINE STORE

ENCODER STEP 1

FIG. 4
INPUTS TO ENCODER STEP 1
| CONDITION | NEW INPUT |
|---|---|
| READY | R CP HP HPLA |
| READY | R CP HP HPLA |
| READY (LAST CYCLE) | R CP HP HPLA |
| WAIT (FIRST CYCLE) (OTHER CYCLES) | W S1 HP HPLA<br>W S1 S2 S3 |
| READY (FIRST CYCLE) | R CP HP HPLA |
| READY | R CP HP HPLA |
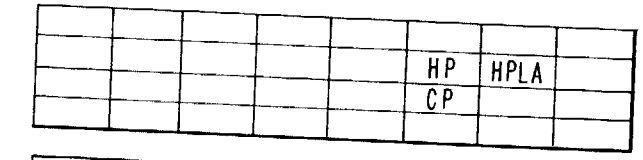
FIG. 4A
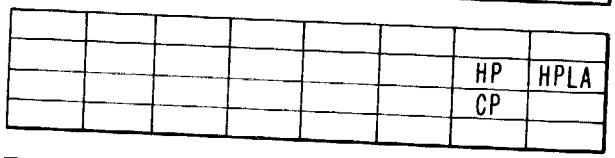
FIG. 4B
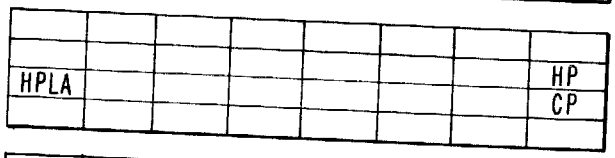
FIG. 4C
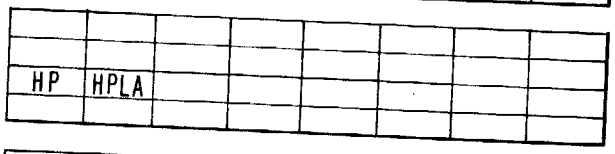
FIG. 4D
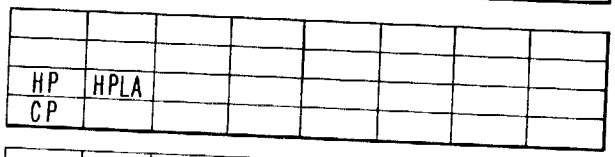
FIG. 4E
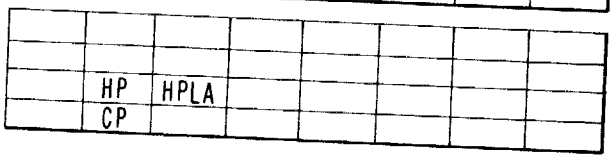
FIG. 4F

STATE DIAGRAM FOR ENCODER STEP 1 (INITIALIZATION)

SYMBOLS USED IN FIGS. 5A-5E

- ○ STATE
- ▭ FEATURE
- △ CT < 2560
- ▽ CT = 2560
- – DON'T CARE

ACTIONS:

- * CT ← CT + 1
- ** CT ← 1

SCANNER CONDITION:

- R READY
- W WAIT

STATE DIAGRAM FOR ENCODER STEP 1 (EOL CODES)

STATE DIAGRAM FOR ENCODER STEP 1
(ONE DIMENSIONAL MODE)

STATE DIAGRAM FOR ENCODER STEP 1 (TWO DIMENSIONAL MODE, WAIT CONDITION)

SIMULATED OPERATION OF ENCODER STEP 1
USING EXAMPLE 4
(CERTAIN CYCLES ONLY)

ENCODER STEP 2

STATE DIAGRAM FOR ENCODER STEP 2

SYMBOLS USED IN FIGS. 8A-8E

▭ OUTPUT

○ STATE

STATE DIAGRAM FOR ENCODER STEP 2
(CONTINUED)

STATE DIAGRAM FOR ENCODER STEP 2
(CONTINUED)

STATE DIAGRAM FOR ENCODER STEP 2 (CONTINUED)

STATE DIAGRAM FOR ENCODER STEP 2 (CONTINUED)

DECODER

DECODER STEP 1

STATE DIAGRAM FOR DECODER STEP 1

STATE DIAGRAM FOR DECODER STEP 1
(CONTINUED)

STATE DIAGRAM FOR DECODER
STEP 1
(CONTINUED)

DECODER STEP 2

DECODER HISTORY LINE STORE

STATE DIAGRAM FOR DECODER STEP 2